United States Patent
Tobe et al.

(10) Patent No.: US 9,600,610 B2
(45) Date of Patent: Mar. 21, 2017

(54) CONVERSION METHOD, PROGRAM AND SYSTEM OF POWER SYSTEM DATA MODELS

(71) Applicant: HITACHI, LTD., Tokyo (JP)

(72) Inventors: Sumito Tobe, Tokyo (JP); Youichi Sugizaki, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 725 days.

(21) Appl. No.: 14/054,892

(22) Filed: Oct. 16, 2013

(65) Prior Publication Data
US 2014/0122051 A1 May 1, 2014

(30) Foreign Application Priority Data
Nov. 1, 2012 (JP) ................... 2012-241598

(51) Int. Cl.
*G06F 17/50* (2006.01)

(52) U.S. Cl.
CPC ...... *G06F 17/5009* (2013.01); *G06F 2217/78* (2013.01)

(58) Field of Classification Search
CPC .... G06F 8/75; G06F 9/4443; G06F 17/30563; G06F 17/211; G06F 7/211; G06F 1/3209; G06F 17/5045; G06F 17/30914; G06B 19/41865; G06B 13/04; G05B 17/02; H02J 3/00; H02J 3/14
See application file for complete search history.

(56) References Cited

U.S. PATENT DOCUMENTS

| | | | |
|---|---|---|---|
| 2002/0099563 A1* | 7/2002 | Adendorff | G06F 17/30563 705/7.11 |
| 2006/0288301 A1* | 12/2006 | Hood | G06F 9/4443 715/762 |
| 2008/0140609 A1* | 6/2008 | Werner | G06F 17/30914 |
| 2008/0195576 A1* | 8/2008 | Sande | G06F 17/30566 |
| 2009/0076749 A1* | 3/2009 | Nasle | G05B 17/02 702/62 |
| 2009/0319093 A1* | 12/2009 | Joos | H02J 3/14 700/297 |
| 2010/0235654 A1* | 9/2010 | Malik | G06F 1/3209 713/300 |
| 2011/0040392 A1* | 2/2011 | Hamann | G05B 13/04 700/30 |

(Continued)

FOREIGN PATENT DOCUMENTS

JP 2010-226864 A 10/2010

*Primary Examiner* — Kandasamy Thangavelu
(74) *Attorney, Agent, or Firm* — Mattingly & Malur, PC

(57) ABSTRACT

A power system data model conversion method, a power system data model conversion system and a power system data model conversion program which are to perform a fast power system analysis and used for a power system analysis capable of reducing inconsistency with another information system, wherein all instances used for the power system analysis are read out from a CIM database server which is commonly used on a power system information system, and a connected relation between instances is constructed while performing recursive retrieval. And, conversion processing of the data model is performed to integrate information necessary for the power system analysis and dispersed to extend over the plural classes of a CIM data model into one class.

5 Claims, 14 Drawing Sheets

(56) References Cited

U.S. PATENT DOCUMENTS

| | | | |
|---|---|---|---|
| 2012/0151419 A1* | 6/2012 | Kent | G06F 8/75 |
| | | | 715/854 |
| 2012/0259611 A1* | 10/2012 | San Andres | G06F 17/5045 |
| | | | 703/18 |
| 2013/0103734 A1* | 4/2013 | Boldyrev | G06F 17/30563 |
| | | | 709/201 |
| 2013/0131840 A1* | 5/2013 | Govindaraj | G05B 19/41865 |
| | | | 700/19 |
| 2013/0282189 A1* | 10/2013 | Stoupis | H02J 3/00 |
| | | | 700/286 |
| 2014/0025650 A1* | 1/2014 | Lee | G06F 17/211 |
| | | | 707/694 |

* cited by examiner

FIG. 6

601 TransformerWinding CLASS

| DATA NAME | TYPE NAME OR UNIT | VALUE |
|---|---|---|
| mRID | String | _7814201 |
| name | String | TransformerWinding1-1 |
| connectionType | WindingConnection | Wye |
| b | Susceptance | 0.02 |
| x | Reactance | 0.01 |
| x0 | Reactance | 0.001 |
| xground | Reactance | 0.001 |
| g | Conductance | 0.005 |
| grounded | Boolean | 0 |
| r | Resistance | 0.1 |
| r0 | Resistance | 0.02 |
| rground | Resistance | 0.01 |
| g | Conductance | 0.04 |
| MemberOf_PowerTransfomer | String | _6814001 |
| Terminals | String | _5236301 |

602 PowerTransformer CLASS

| DATA NAME | TYPE NAME OR UNIT | VALUE |
|---|---|---|
| mRID | String | _423303 |
| name | String | PowerTransformer1 |
| bmagSat | PerCent | 50 |
| magBaseKV | Voltage | 80 |
| magSatFlux | PerCent | 20 |
| phases | PhaseCode | ABN |
| transfCoolingType | TransformerCoolingType | Air |
| Contains_Transformer Windings | String | _8223696 |
| Contains_Transformer Windings | String | _7852336 |

603 Terminal CLASS

| DATA NAME | TYPE NAME OR UNIT | VALUE |
|---|---|---|
| mRID | String | _1102302 |
| name | String | T00000001 |
| ConductingEquipment | String | _8652233 |
| ConnectivityNode | String | _8445721 |

FIG. 7

701 ConnectivityNode CLASS

| DATA NAME | TYPE NAME OR UNIT | VALUE |
|---|---|---|
| mRID | String | _5236441 |
| name | String | CN0000001 |
| Terminals | Strings | _5236988 |
| Terminals | String | _4751143 |

702 Breaker CLASS

| DATA NAME | TYPE NAME OR UNIT | VALUE |
|---|---|---|
| mRID | String | _3473201 |
| name | String | CB0000001 |
| ampRating | CurrentFlow | 100 |
| inTransitTime | Seconds | 0.02 |
| Terminals | Strings | _2369581 |
| Terminals | String | _2536641 |

703 Disconnector CLASS

| DATA NAME | TYPE NAME OR UNIT | VALUE |
|---|---|---|
| mRID | String | _3473523 |
| name | String | DC0000001 |
| normalOpen | Boolean | 0 |
| switchOnCount | Counter | 150 |
| switchOnDate | AbsoluteDateTime | 2012/9/9 |
| phase | PhaseCode | A |
| Terminals | String | _1002325 |
| Terminals | String | _0236057 |

704 BusbarSection CLASS

| DATA NAME | TYPE NAME OR UNIT | VALUE |
|---|---|---|
| mRID | String | _2238601 |
| name | String | Bus0000001 |
| BaseVoltage | String | _0215663 |
| Terminals | String | _7787741 |

705 BaseVoltage CLASS

| DATA NAME | TYPE NAME OR UNIT | VALUE |
|---|---|---|
| mRID | String | _2636515 |
| name | String | BaseVol0000001 |
| nominalVoltage | Voltage | 220000 |

FIG. 8

801 MAIN FACILITY TABLE

| mRID OF INSTANCE |
| --- |
| FACILITY TYPE |
| COMPONENT DEVICE LIST |
| TERMINAL END LIST |

802 MAIN FACILITY PROCESSING ORDER LIST

| PowerTransformer |
| --- |
| BusbarSection |

⋮

803 FACILITY TYPE TABLE

| mRID OF INSTANCE |
| --- |
| FACILITY TYPE |

RECURSIVE RETRIEVAL PROCESSING

TERMINAL END PROCESSING

POWER SYSTEM ANALYSIS DATA GENERATION PROCESSING

FIG. 14

1401 PowerTransformer CLASS

| DATA NAME | TYPE NAME OR UNIT | NUMERICAL VALUE | ACQUISITION SOURCE CLASS | ATTRIBUTE |
|---|---|---|---|---|
| FACILITY No. | String | | NONE (AUTOMATIC NUMBERING) | |
| name | String | PowerTransformer1 | PowerTransformer | name |
| PRIMARY SIDE POSITIVE-PHASE REACTANCE | Reactance | 0.01 | TransformerWinding | x |
| PRIMARY SIDE ZERO-PHASE REACTANCE | Reactance | 0.001 | TransformerWinding | x0 |
| PRIMARY SIDE POSITIVE-PHASE RESISTANCE | Resistance | 0.1 | TransformerWinding | r |
| PRIMARY SIDE ZERO-PHASE RESISTANCE | Resistance | 0.02 | TransformerWinding | r0 |
| PRIMARY SIDE LINE CONNECTING SYSTEM | Winding Connection | Wye | TransformerWinding | connection Type |
| PRIMARY SIDE GROUNDING REACTANCE | Reactance | 0.001 | TransformerWinding | xground |
| PRIMARY SIDE GROUNDING RESISTANCE | Resistance | 0.01 | TransformerWinding | rground |
| SECONDARY SIDE POSITIVE-PHASE REACTANCE | Reactance | 0.008 | TransformerWinding | x |
| SECONDARY SIDE ZERO-PHASE REACTANCE | Reactance | 0.0008 | TransformerWinding | x0 |
| SECONDARY SIDE POSITIVE-PHASE RESISTANCE | Resistance | 0.08 | TransformerWinding | r |
| SECONDARY SIDE ZERO-PHASE RESISTANCE | Resistance | 0.016 | TransformerWinding | r0 |
| SECONDARY SIDE GROUNDING SYSTEM | Winding Connection | Delta | TransformerWinding | connection Type |
| SECONDARY SIDE GROUNDING REACTANCE | Reactance | | TransformerWinding | xground |
| SECONDARY SIDE GROUNDING RESISTANCE | Resistance | | TransformerWinding | rground |
| CONNECTION FACILITY | POINTER OF INSTANCE OF CONNECTING FACILITY | | | |

CONVERSION METHOD, PROGRAM AND SYSTEM OF POWER SYSTEM DATA MODELS

BACKGROUND OF THE INVENTION

The present invention relates to a conversion method, conversion system and conversion program of power system data models for converting the data model which is used for a power system facility to an appropriate format.

The power system facility must keep supplying stable power for meeting the changing demands for power by users. Therefore, the power system facility is constantly monitored and its operating condition is analyzed. In order for such monitoring and analysis, a variety of information systems have been developed by many manufacturers including the present applicant. Specifically, they are an EMS (Energy Management System), a power system analysis system, a facility operation system, a statistical recording system, etc.

Each of such information systems had its own particular power facility database. Therefore, there were disadvantages that different types of information systems cannot commonly use a facility data model, a maintenance cost is required for each of the information systems, and the computed results output by the respective information systems cannot be matched mutually.

To solve the above problems, a CIM (Common Information Model) is standardized as a power system data model which is commonly usable among different types of information systems. This CIM is an object-oriented data model defined in a UML (Unified Modeling Language) and designed as a highly-versatile data model such that its use is not limited to the power system monitoring task and analysis task but can also be used extensively for tasks for electricity trading, facility maintenance and management, etc. By the above features, the CIM can unify power system data that is used by different types of information systems, so that there are provided merits that differences among data used by individual information systems are decreased and the data maintaining labor can be saved substantially.

A prior art document which seems relevant to the present invention is Japanese Patent Laid-Open No. 2010-226864. Japanese Patent Laid-Open No. 2010-226864 discloses a technical content that to make a database of a system analysis device that an analysis tool and a database can be input and output in a script language, an application text file is undergone program conversion via rule description means based on CIM, common formatted and stored in a database through a registration program. That is, the technical content disclosed in Japanese Patent Laid-Open No. 2010-226864 is an information system which is proposed by making use of the characteristic of the CIM.

SUMMARY OF THE INVENTION

The CIM can be used for any information system, in other words, it is mainly designed to have high versatility, so that it has a characteristic that the unit of each data model is small. The CIM having the above characteristic is redundant particularly for the power system analysis system, because it contains data unnecessary for power system analysis. The redundant data decreases the speed of computing processing such as power system analysis. When the redundant data is transmitted and received through a LAN, unnecessary traffic increases, and the performance of the LAN configuring the information system is lowered.

The present invention has been made to solve the subjects described above and to provide a power system data model conversion method, a power system data model conversion system and a power system data model conversion program which are to perform a fast power system analysis and used for a power system analysis capable of reducing inconsistency with another information system.

To solve the subjects, the power system data model conversion method according to the present invention executes an instance readout step of reading out all instances from a database which stores devices of the power system in an object format according to an object-oriented data model; and a connected relation analysis step of following a connected relation of a main device, which is among the devices and subject to power system analysis, with the other devices which are connected to the main device.

Based on the analysis result in the connected relation analysis step, a property information aggregation step is executed to create a power system analysis data model by aggregating property information recorded in one or more of the instances into a single instance and also erasing the instance unnecessary for the power system analysis.

The present invention can provide a power system data model conversion method, a power system data model conversion system and a power system data model conversion program which are used for power system analysis by which power system analysis is executed at a high speed and inconsistency with another information system can be reduced.

Other objects, structures and effects not described above will be clear from the description of the following embodiments.

BRIEF DESCRIPTION OF THE DRAWINGS

FIG. 6 is a diagram showing field structures of a device and virtual device classes.

FIG. 7 is a diagram showing field structures of a device and virtual device classes.

FIG. 8 is a diagram showing a field structure in tables which are handled by a model conversion processing section of a power system analysis server.

FIG. 14 is a diagram showing an example of a field structure of PowerTransformer class for the power system analysis data.

DESCRIPTION OF THE EMBODIMENTS

[Whole Structure]

Figure 1:
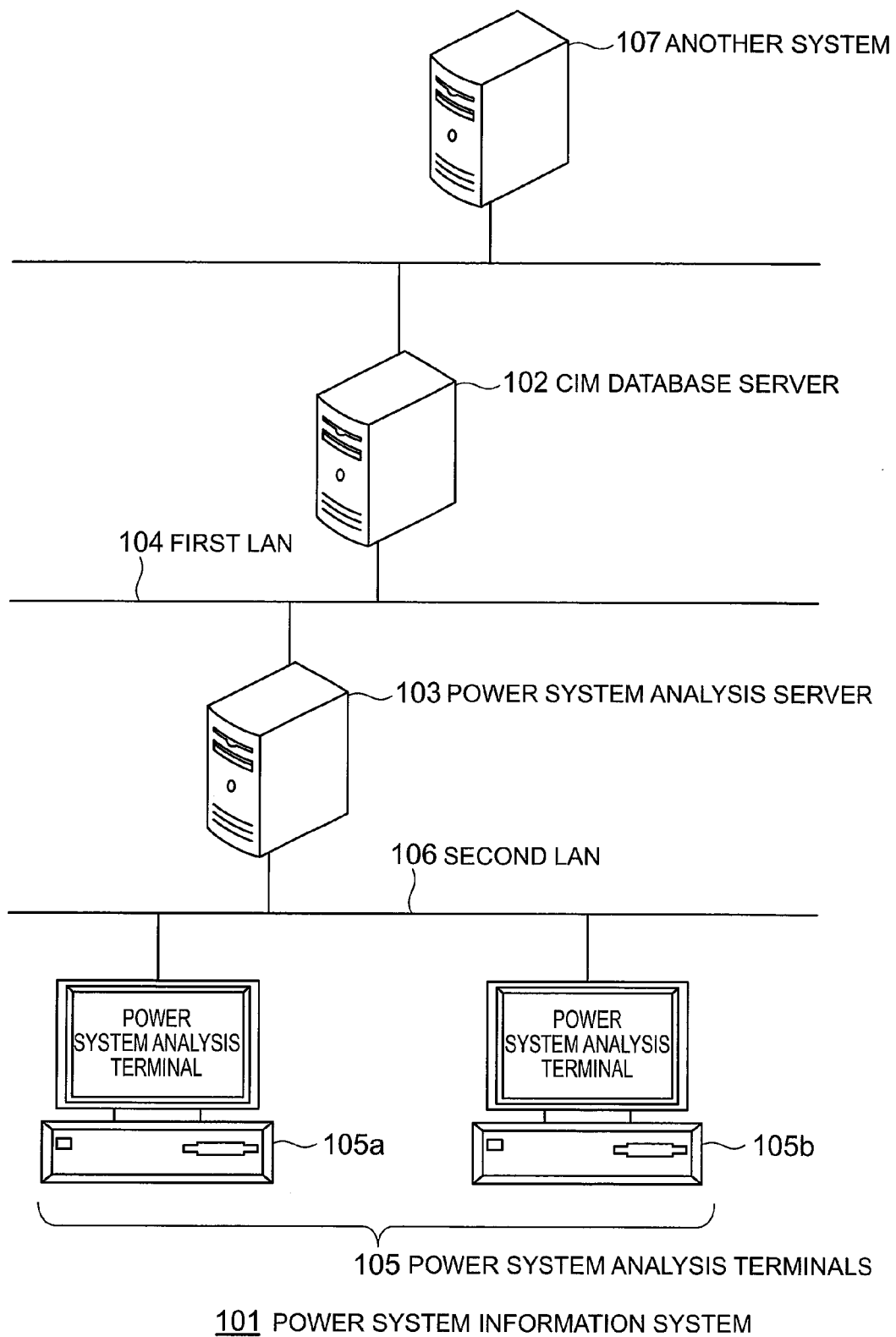
FIG. 1 is a block diagram schematically showing a power system information system according to an embodiment of the present invention.

FIG. 1 is a block diagram schematically showing a power system information system 101 according to an embodiment of the present invention.

The power system information system 101 is configured by having a CIM database server 102 and a power system analysis server 103 each connected to a first LAN 104, and the power system analysis server 103 and a power system analysis terminal 105 each connected to a second LAN 106.

The CIM database server 102 is a database server which stores power facility data described by the CIM. The CIM database server 102 records data (device data) related to devices, such as a transformer, a generator, a load, a power line, etc., which are used for the power system, according to the CIM format. In addition, the CIM database server 102 also records information such as a relation of mutual connection among the respective devices, a value of power flow in the power system, an on/off state of a switch device, a position state of a transformer tap, etc. In the CIM database server 102, each device is defined by a class described later depending on its type, and each device itself is expressed as an instance belonging to its class.

When an object data model which is used for object orientation is applied to a table, the class corresponds to the field structure in the table, and the instance corresponds to the record.

Examples of power facility data stored in the CIM database server 102 are described later with reference to FIG. 6 and FIG. 7.

The class can have a function in addition to an attribute, but the function does not directly relate to the present invention. Therefore, the function is omitted from the description in the class described in this embodiment.

The power system analysis server 103 is a server which analyzes the power system. It receives operation information from the power system analysis terminal 105 and sends back the computed result based on the operation information to a power system analysis terminal 105a and/or 105b. In such case, the power system analysis server 103 does not receive data directly from the CIM database server 102 but uses a facility database for power system analysis which is provided inside and to be described later with reference to FIG. 4. This facility database for power system analysis is generated from the CIM database server 102 by a model conversion processing section (see FIG. 4) which is provided in the power system analysis server.

A protocol of the service provided by the power system analysis server 103 can be used in various forms such as a general HTTP (Hyper Text Transfer Protocol).

A client program which operates in the power system analysis terminal 105 is a program corresponding to the protocol of the service provided by the power system analysis server 103. For example, when the above-described HTTP is used, a general web browser is executed.

Another system 107 for a monitoring task or the like other than the power system analysis server 103 directly refers to the CIM database server 102 or has a model conversion processing function as in this embodiment and might use data of the CIM database server 102 by converting to internal data.

Figure 2:
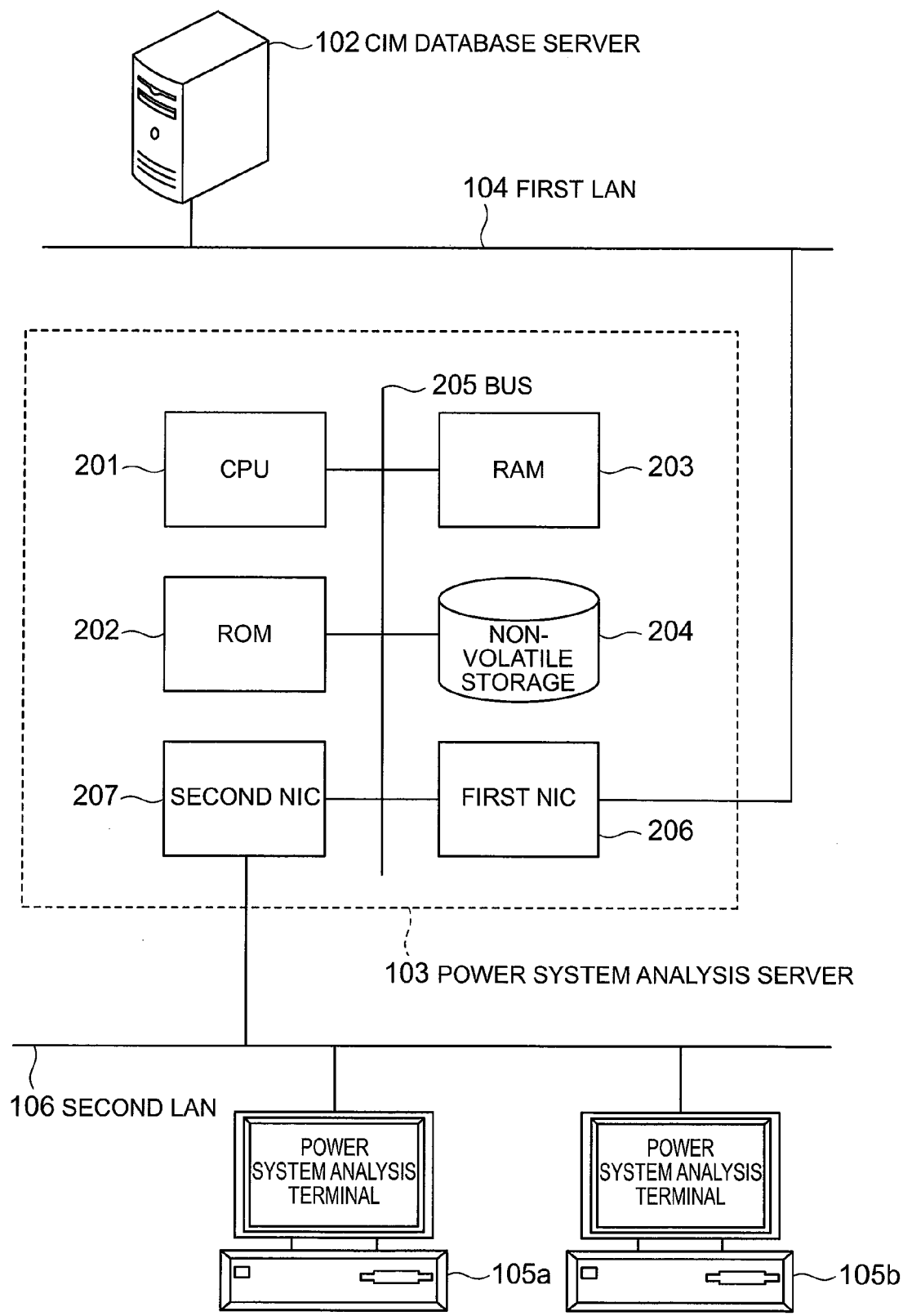
FIG. 2 is a block diagram showing a hardware structure of a power system analysis server.

FIG. 2 is a block diagram showing a hardware structure of the power system analysis server 103.

The power system analysis server 103 is a well-known microcomputer, and a CPU 201, a ROM 202, a RAM 203 and a non-volatile storage 204 are connected to a bus 205.

The bus 205 is also connected to a first NIC 206 which is connected to the first LAN 104 and a second NIC 207 which is connected to the second LAN 106.

The non-volatile storage 204 which is comprised of a hard disk device or the like stores a program for activating the microcomputer as the power system analysis server 103 and the facility database for power system analysis.

The power system information system 101 shown in FIG. 1 is configured with the first LAN 104, to which the CIM database server 102 is connected, separated from the second LAN 106 to which the power system analysis terminal 105 is connected so that the power system analysis terminal 105 is not directly connected to the CIM database server 102. This network structure is not necessarily configured as described above, and if a security policy allows, it may be configured to connect the CIM database server 102 and the power system analysis terminal 105 to the same LAN.

Figure 3:
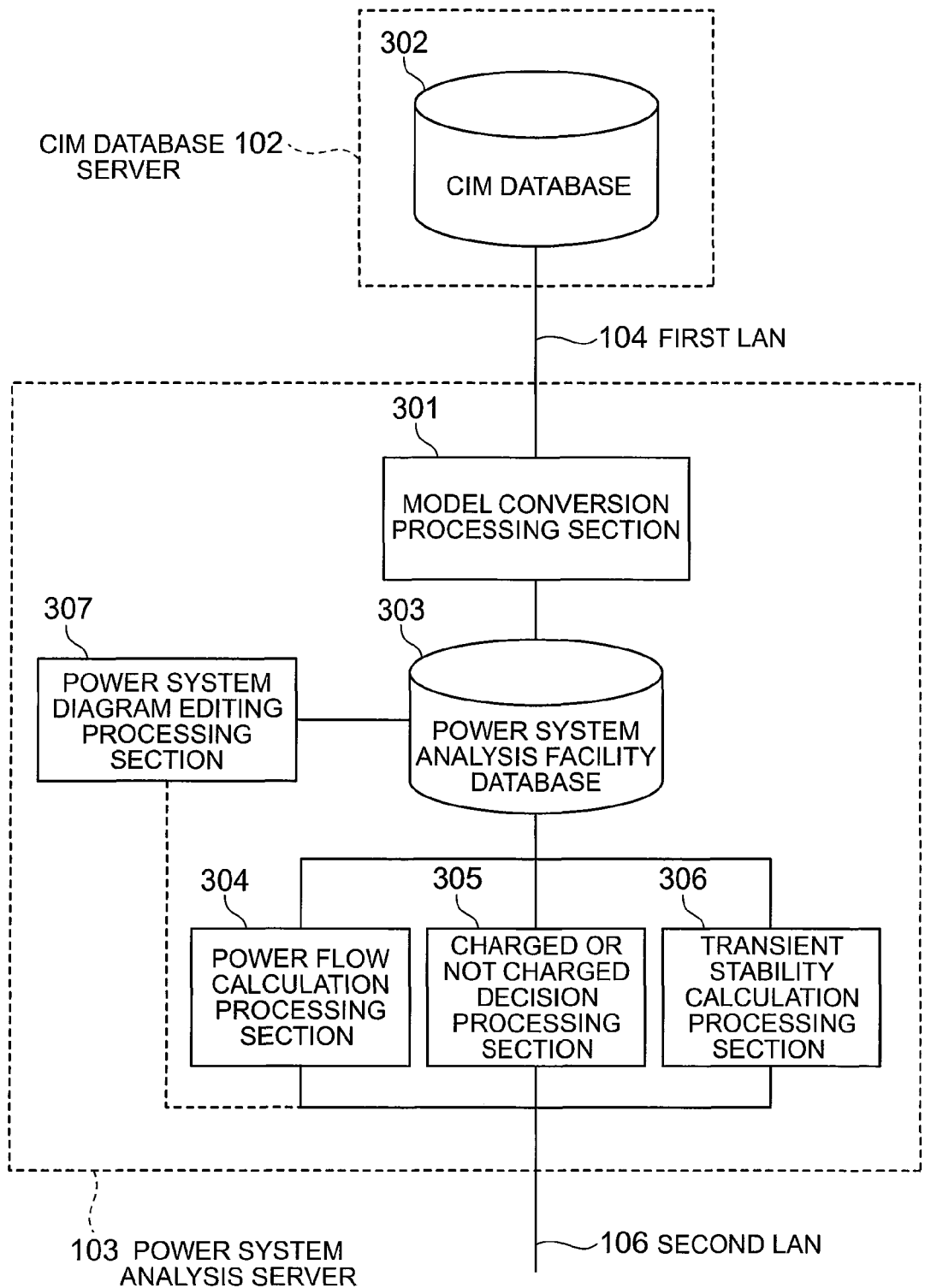
FIG. 3 is a block diagram showing a function of software of the power system analysis server.

FIG. 3 is a block diagram showing a function of software of the power system analysis server 103.

A model conversion processing section 301 reads in a CIM database 302 from the CIM database server 102 and converts to a power system analysis facility database 303.

The power system analysis facility database 303 is used by a power flow calculation processing section 304, a charged or not charged decision processing section 305 and a transient stability calculation processing section 306, which are functions for the power system analysis, and they provide services to the power system analysis terminal 105.

In the power system information system 101 of this embodiment, particularly the model conversion processing section 301 is described in detail.

It is also possible to edit the power system analysis facility database 303 from the power system analysis terminal 105 by using the GUI provided by a power system diagram editing processing section 307. Especially, a power system analysis application program cannot satisfy a demand for analysis work by only the information provided by the CIM database server 102 and occasionally needs highly professional information which is not defined by the CIM database server 102. Such information is not defined in the CIM database server 102 but can be edited to add information required for the power system analysis by using the power system diagram editing processing section 307. Thus, later addition of "site-local" information can operate the power system analysis application program without influencing on the other systems.

[CIM Data Model and Power System Analysis Data Model]

Before describing the model conversion processing executed by the model conversion processing section 301, a CIM data model which is subject to the model conversion processing, and a power system analysis data model which is undergone the model conversion processing are described.

Figure 4:
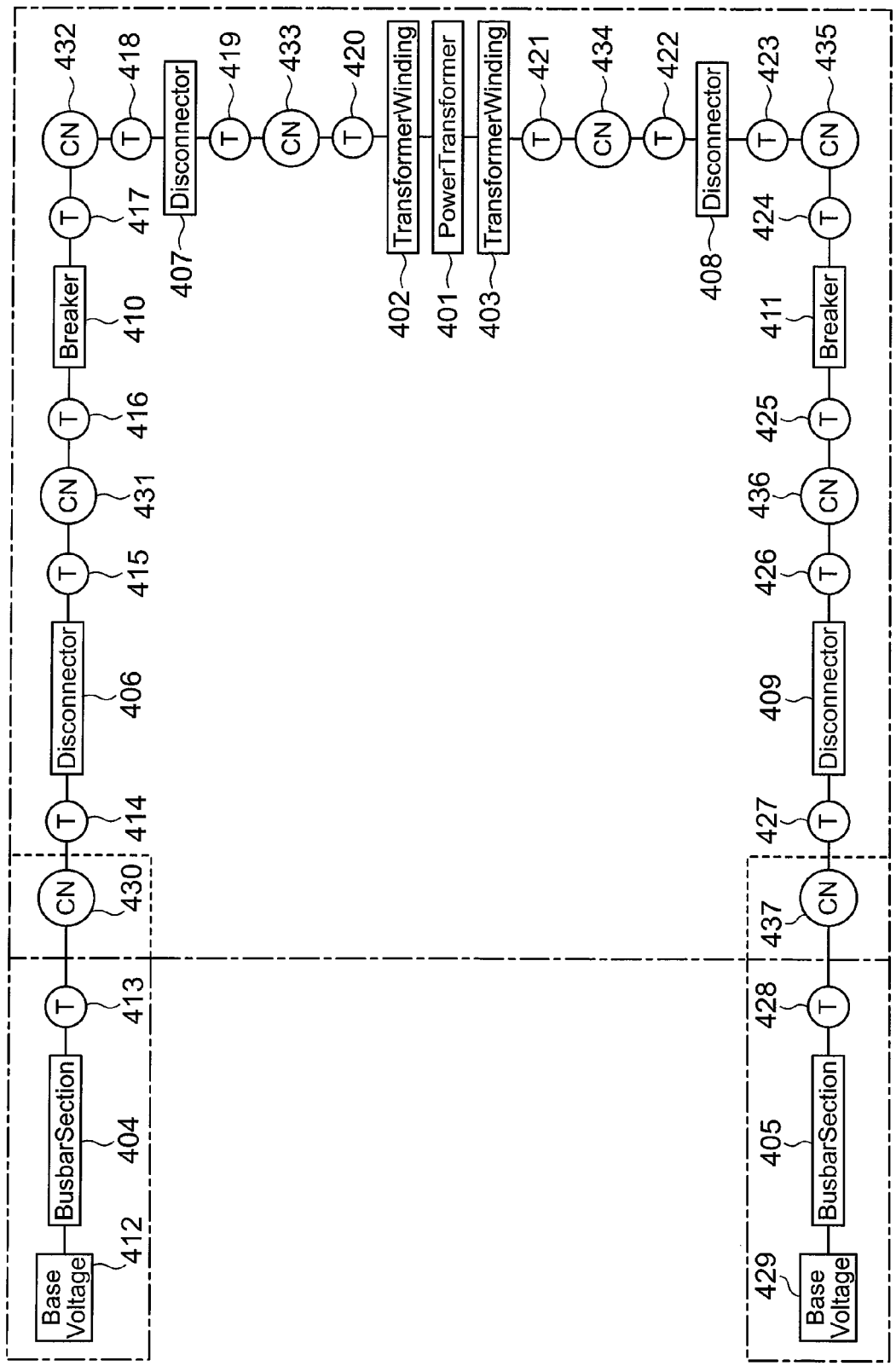
FIG. 4 is an instance diagram showing two busses and one transformer by using a CIM data model.

FIG. 4 is an instance diagram showing two busses and one transformer by using a CIM data model.

In FIG. 4, all actual devices are indicated by a rectangular instance, and the instance class name is indicated therein.

A transformer 401 has a class name "PowerTransformer".

Transformer windings 402 and 403 have a class name "TransformerWinding".

Busses 404 and 405 have a class name "BusbarSection".

Switches 406, 407, 408 and 409 have a class name "Disconnector". The switches are switch devices which do not have a current cutoff function synchronized with an alternating-current phase.

Circuit breakers 410 and 411 have a class name "Breaker". The circuit breakers are switch devices having a current cutoff function in synchronization with the alternating-current phases. A switch is provided at either end of the circuit breaker for the maintenance work of the facility.

Voltages 412 and 429 which are generated by an unshown generator have a class name "BaseVoltage".

In FIG. 4, there are instances (virtual instances) not having a reality for showing a connected relation of the devices other than all actual devices. Such virtual instances are indicated by the circle.

Instances indicated by "T" have a class name "Terminal". Terminal instances 413, 414, 415, 416, 417, 418, 419, 420, 421, 422, 423, 424, 425, 426, 427 and 428 are virtual instances which represent ends of the actual devices.

The instances indicated by "CN" have a class name "ConnectivityNode". ConnectivityNode instances 430, 431, 432, 433, 434, 435, 436 and 437 are virtual instances which are provided to show a connected relation of the mutual terminal instances 413, 414, 415, 416, 417, 418, 419, 420, 421, 422, 423, 424, 425, 426, 427 and 428. For example, the ConnectivityNode instance 430 is arranged between the Terminal instance 413 and the Terminal instance 414 in FIG. 4. The other ConnectivityNode instances 431 to 437 are also arranged in the same manner.

Hereafter, the Terminal instances and the ConnectivityNode instances are collectively called the "virtual device".

The class name only is indicated below to show the instances excluding a case that it is especially distinguished from the class. For example, the BusbarSection instance is indicated as BusbarSection with the term "instance" omitted.

In FIG. 4, BusbarSection, Disconnector and Breaker each have Terminal at either end.

On the other hand, PowerTransformer has TransformerWinding at either end, and the TransformerWinding has Terminal at the other end. The transformer is expressed as a primary winding (TransformerWinding), a secondary winding (TransformerWinding), and as interaction (PowerTransformer) between the above windings.

Figure 5:
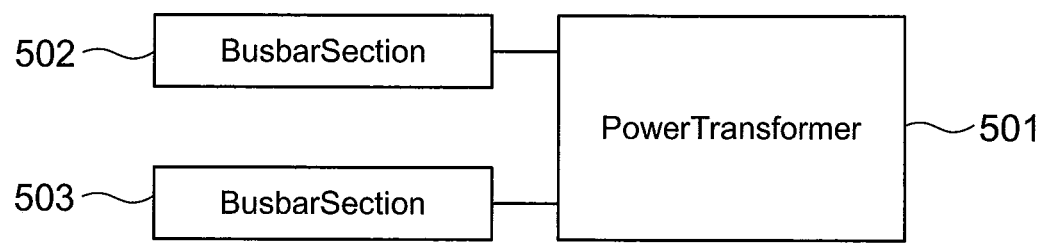
FIG. 5 is an instance diagram showing two busses and one transformer by using a power system analysis data model.

FIG. 5 is an instance diagram showing two busses and one transformer by using a power system analysis data model.

For the device shown in the instance diagram shown in FIG. 4, the element needed for the power system analysis server 103 to perform power system analysis is only a state "two BusbarSections 502 and 503 are connected to one PowerTransformer 501". In other words, for the power system analysis by the power system analysis server 103, not only the virtual instance of Terminal and ConnectivityNode, but also the instance of Disconnector, Breaker and TransformerWinding are unnecessary for the power system analysis.

When the instance diagram according to the CIM data model of FIG. 4 is compared with the instance diagram according to the power system analysis data model of FIG. 5, it is clearly apparent that the CIM data model is redundant. If the power flow calculation processing section 304 or the like communicates directly with the CIM database server 102 to perform power system analysis, a huge amount of instances are read in through the first LAN 104. And, since a relation of connection among respective instances must be followed, the amount of data coming and going along the first LAN 104 becomes huge. Therefore, it is easily assumed that the computed amount by the power flow calculation processing section 304 or the like also becomes huge.

[One Example of CIM Data Model]

An example of the CIM data model is described below.

FIG. 6 and FIG. 7 are diagrams showing field structures of classes of the actual devices and the virtual devices according to the CIM data model. Each field which forms the class is also called a member variable in the object orientation world and also called an attribute or a property in the UML world.

First, all device classes and virtual device classes are provided with an mRID field. The mRID which can also be called identification information and is stored in the mRID field is information for uniquely identifying (namely, unique and not overlapped) all instances belonging to all classes. In this embodiment, the mRID field has a value which is character string data starting with "_(under bar)" and followed by seven-digit figures.

All classes are provided with a name field. The name field has a name noted on all instances. is the rule that the name field must be provided in the UML. It is determined to provide the name field according to the UML.

In the case of the class of an actual device, a property information field is provided to store information on electrical or physical properties possessed by the device. The type and number in the property information field are various depending on the device property.

Excepting some special classes such as BaseVoltage class to be described later, most of the classes have a field for storing mRID of the instance adjacent to the own instance. In other words, there is a field showing a connected relation among the respective instances.

In addition to the above-described mRID field and name field, a TransformerWinding class 601 is provided with a property information field such as a connectionType field, a MemberOf_PowerTransformer field as a field showing a connected relation between instances, and a Terminals field.

The MemberOf_PowerTransformer field stores the mRID of the PowerTransformer instance adjacent to the TransformerWinding instance.

The Terminals field stores the mRID of the Terminals instance adjacent to the TransformerWinding instance.

In addition to the above-described mRID field and name field, a PowerTransformer class 602 is provided with two fields, namely a property information field such as a bmagSat field and a Contains_TransformerWinding field as a field showing a connected relation between instances.

The Contains_TransformerWinding field stores the mRID of the TransformerWinding instance which is adjacent to the PowerTransformer instance.

In addition to the above-described mRID field and name field, a Terminal class 603 is provided with a ConductingEquipment field and a ConnectivityNode field as fields showing a connected relation between instances.

The ConductingEquipment field stores the mRID of the device instance adjacent to the Terminal instance. Since the Terminal instance is an instance positioned at the terminal end of every device, the ConductingEquipment field stores the mRID of the instance of every class other than the ConnectivityNode.

The ConnectivityNode field stores the mRID of the ConnectivityNode instance adjacent to the Terminal instance. The Terminal instance is provided with the ConnectivityNode field because it is an instance always connected to another Terminal instance via the ConnectivityNode instance.

Referring to FIG. 7, the field structure of the class is further described.

In addition to the above-described mRID field and name field, a ConnectivityNode class 701 is provided with two Terminals fields as fields showing a connected relation between instances.

The Terminals field stores the mRID of the Terminal instance adjacent to the ConnectivityNode instance.

In addition to the above-described mRID field and name field, a Breaker class 702 is provided with two fields, namely a property information field such as ampRating field, and a Terminals field as a field showing a connected relation between instances.

The Terminals field stores the mRID of the Terminal instance adjacent to the Breaker instance.

In addition to the above-described mRID field and name field, a Disconnector class 703 is provided with two fields, namely a property information field such as a normalOpen field, and a Terminals field as a field showing a connected relation between instances.

The Terminals field stores the mRID of the Terminal instance adjacent to the Disconnector instance.

In addition to the above-described mRID field and name field, a BusbarSection class 704 is provided with a Base-Voltage field and a Terminals field as fields showing a connected relation between instances.

The BaseVoltage field stores the mRID of BaseVoltage instance adjacent to BusbarSection instance.

The Terminals field stores the mRID of Terminal instance adjacent to the BusbarSection instance.

In addition to the above-described mRID field and name field, a BaseVoltage class 705 is provided with a property information field such as a normalVoltage field.

The BaseVoltage class 705 does not have a field which stores the mRID of the instance adjacent to the BaseVoltage instance.

[Model Conversion Processing]

Referring to flow charts of FIG. 9, FIG. 10, FIG. 11 and FIG. 13 and diagrams of FIG. 8, FIG. 12 and FIG. 14, model conversion processing from the CIM data model to the power system analysis data model executed by the model conversion processing section 301 of the power system analysis server 103 is described.

FIG. 8 is a diagram showing a field structure of tables which are handled by the model conversion processing section 301 of the power system analysis server 103.

A main facility table 801 has an mRID field of the instance, a facility type field, a component device list field, and a terminal end list field.

The mRID field of the instance stores the mRID of the instance of the main device.

The facility type field stores the class name of the instance of the main device.

The component device list field stores a list enumerating the mRID of device contained in the instance of the main device including the virtual device.

The terminal end list field stores a list enumerating the mRID of the ConnectivityNode instance connected to the Terminal instance positioned at the terminal of the main device.

The main facility table 801 is a table created when the model conversion processing section 301 performs model conversion processing from the CIM data model to the power system analysis data model. The model conversion processing section 301 creates the power system analysis data model according to the records recorded in the main facility table 801.

The main facility table 801 creates records on only the instances of the main facility.

A main facility processing order list 802 is a list enumerating the class names of the main facility in a processing order.

The main facility processing order list 802 is a list which is referred to when the model conversion processing section 301 performs model conversion processing from the CIM data model to the power system analysis data model. In the order enumerated in this list, it is determined to which instance of the device the ConnectivityNode instance belongs.

A facility type table 803 has an mRID field of the instance and a facility type field.

The mRID field of the instance stores the mRID of the instance of the device.

The facility type field stores the class name of the instance of the device.

The facility type table 803 is a table created first when the model conversion processing section 301 performs model conversion processing from the CIM data model to the power system analysis data model. When the main facility table 801 is created, the model conversion processing section 301 uses the facility type table 803 to judge the class of the mRID from the mRID.

In the facility type table 803, records are created about the instances of all facilities including virtual facilities.

Figure 9:
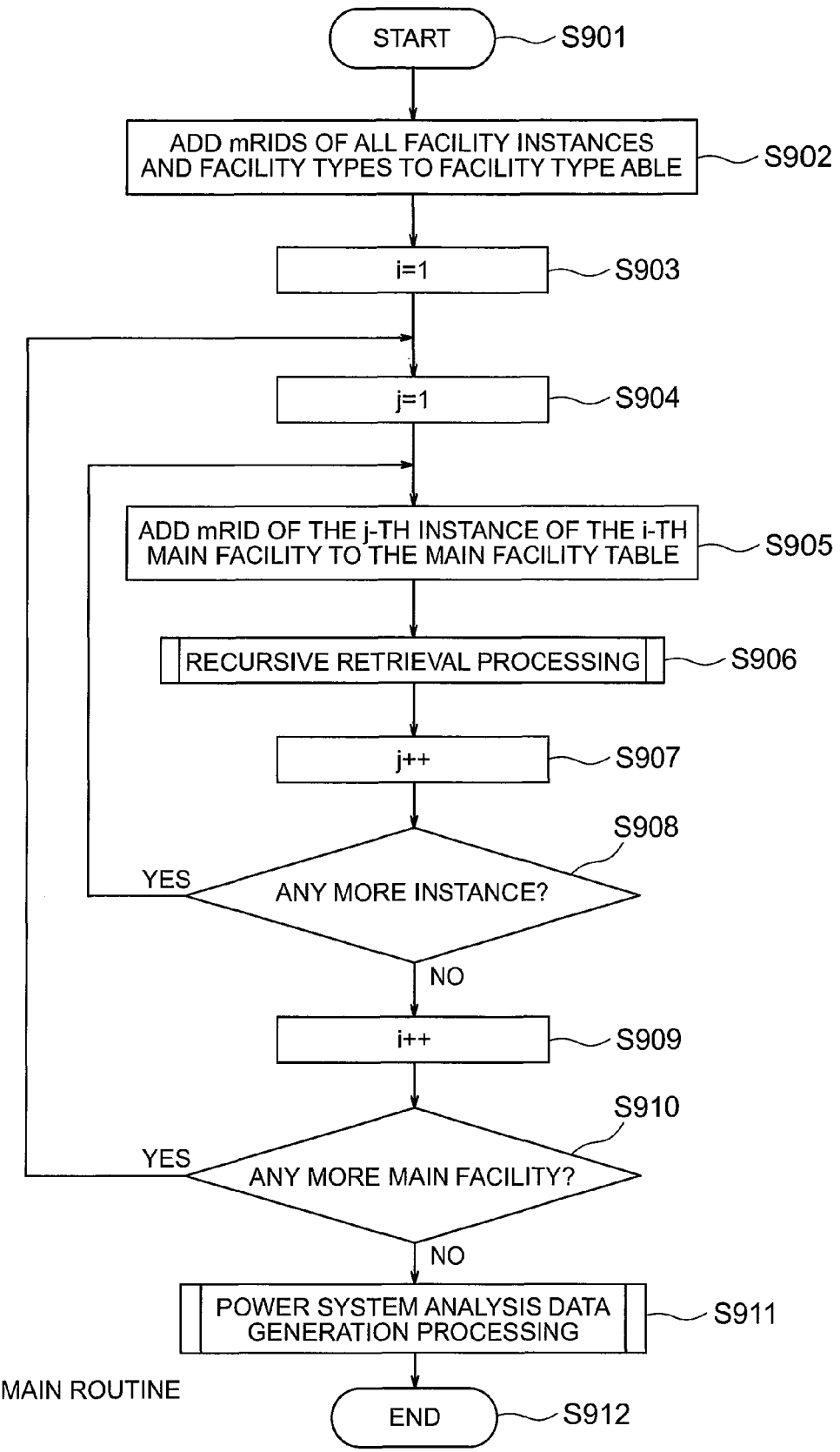
FIG. 9 is a flow chart showing a main routine of model conversion processing that is executed by a model conversion processing section of the power system analysis server.

FIG. 9 is a flow chart showing a main routine of model conversion processing executed by the model conversion processing section 301 of the power system analysis server 103.

In flow charts including FIG. 9 to be described below, counter variables such as "i" and "j" are used. All these counter variables are local variables of which applied range is local, and it shall be noted that the values of counter variables do not affect on other subroutines or functions exceeding the subroutines or functions noted in the flow charts.

When processing is started (S901), the model conversion processing section 301 (see FIG. 3) first reads out mRID of all instances from the CIM database server 102 to create the facility type table 803 showing a correspondence relation between mRID and facility type (class name) about classes of all facilities (S902).

The model conversion processing section 301 then initializes the counter variable i to 1 (S903) and initializes the counter variable j to 1 (S904).

The model conversion processing section 301 then refers to an i-th record of the main facility processing order list 802 to know the class name of the main device to be processed now. And, the mRID of a j-th instance of the main device of the relevant class name is read out from the CIM database server 102, a new record is added to the main facility table 801, and the mRID is recorded (S905).

And, recursive retrieval processing is performed on the record added to the main facility table 801 in step S905 and the mRID of the j-th instance recorded in the record (S906).

Here, a parameter (argument) of the recursive retrieval processing in step S906 is the record in the main facility table 801 and the mRID of the instance.

When the recursive retrieval processing is completed on the mRID of the j-th instance which was added to the main facility table 801 in step S905, the model conversion processing section 301 then increments the counter variable j by one (S907). In FIG. 9 and following drawings, "++" indicates an increment. The model conversion processing section 301 then checks whether or not there is the j-th instance of the main device of the relevant class name (S908).

If there is the j-th instance of the main device of the relevant class name (YES in S908), the model conversion processing section 301 continues the processing from step S905 again.

If there is not the j-th instance of the main device of the relevant class name (NO in S908), the model conversion processing section 301 then increments the counter variable i by one (S909). And, the model conversion processing section 301 checks whether or not there is the i-th record of the main facility processing order list 802 (S910).

If there is the i-th record of the main facility processing order list 802 (YES in S910), the model conversion processing section 301 continues the processing from step S904 again.

If there is not the i-th record of the main facility processing order list 802 (NO in S910), the recording processing of the record to the main facility table 801 has completed at this time, so that the model conversion processing section 301 executes the power system analysis data generation processing according to the main facility table 801 (S911), and the above series of processing is terminated (S912).

Figure 10:
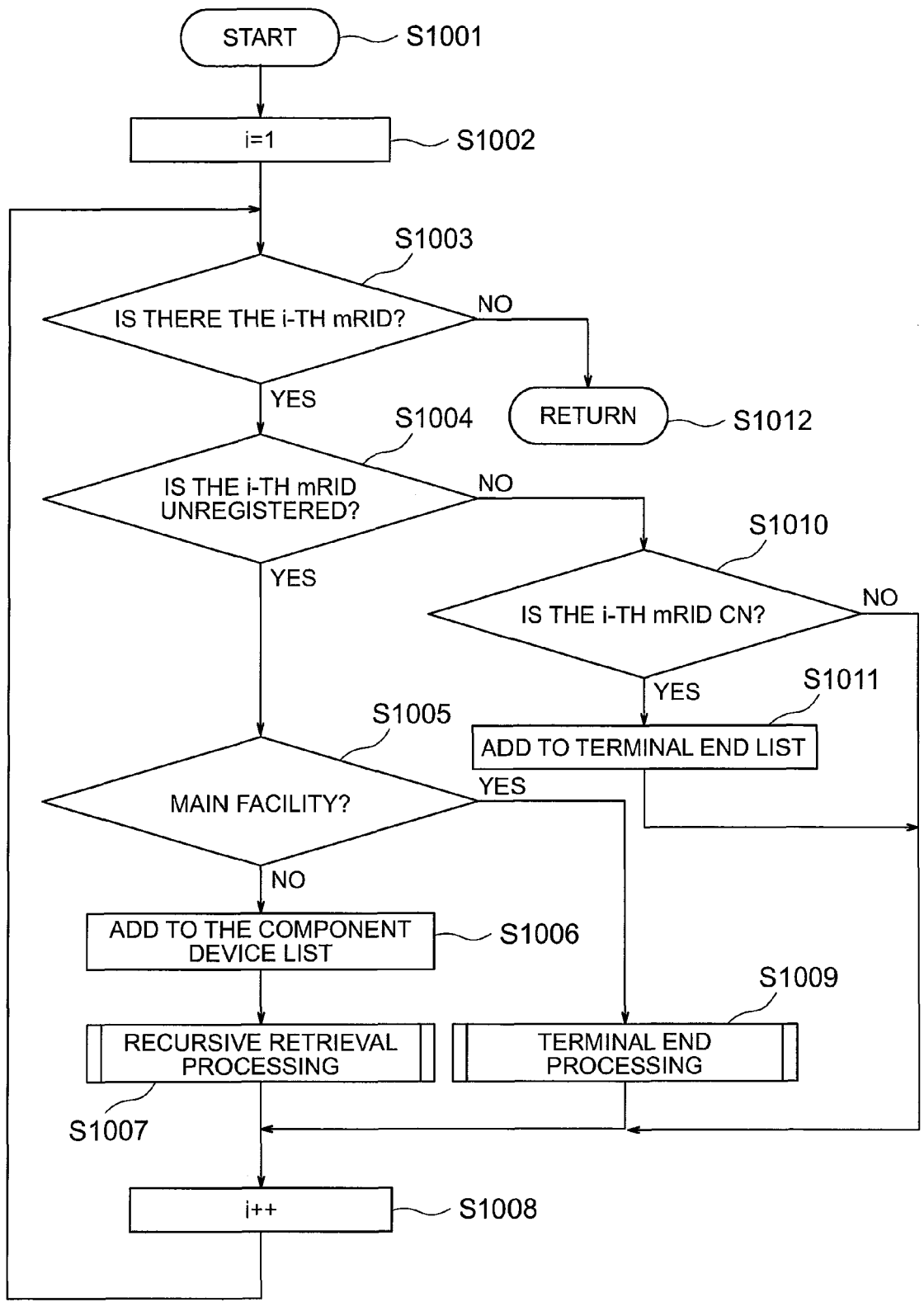
FIG. 10 is a flow chart showing a flow of recursive retrieval processing that is executed by the model conversion processing section of the power system analysis server.

FIG. 10 is a flow chart showing a flow of recursive retrieval processing that is executed by the model conversion processing section 301 of the power system analysis server 103. It shows the details of step S906 of FIG. 9.

When the processing is started (S1001), the model conversion processing section 301 initializes the counter variable i to 1 (S1002).

Then, for the instances of the main device now attracting attention, the model conversion processing section 301 inquires the CIM database server 102 to check whether or not there is the i-th mRID which is stored in the field showing a connected relation between the instances (S1003).

If the instance of the main device now attracting attention has the i-th mRID (YES in S1003), the model conversion processing section 301 then checks whether or not the relevant mRID is a device not registered in either the mRID field of the instance in the main facility table 801 or the component device list field (S1004).

In step S1004, if the i-th mRID is mRID not registered in the main facility table 801 (YES in S1004), the model conversion processing section 301 then reads out the facility type (class name) of the relevant mRID from the facility type table 803. It is then checked whether or not the relevant facility type is given in the main facility processing order list 802, namely whether or not the relevant mRID is the main device (S1005).

In step S1005, if the relevant mRID is not the main device (YES in S1005), the model conversion processing section 301 adds the relevant mRID to the component device list field of the record now attracting attention in the main facility table 801 (S1006). And, the recursive retrieval processing is performed on the record now attracting attention in the main facility table 801 and the relevant mRID (S1007).

Here, parameters (arguments) of the recursive retrieval processing in step S1007 are mRID of the record in the main facility table 801 and the instance added to the component device list field.

When the recursive retrieval processing is completed on the mRID of the instance added to the main facility table 801 in step S1007, the model conversion processing section 301 then increments the counter variable i by one (S1008). And, the model conversion processing section 301 repeats the processing from step S1003 again.

If the relevant mRID is the main device in step S1005 (YES in S1005), the model conversion processing section 301 performs terminal end processing on the relevant mRID (S1009). The model conversion processing section 301 then increments the counter variable i by one (S1008) and repeats the processing from step S1003 again.

If the i-th mRID is the mRID registered in the main facility table 801 in step S1004 (NO in S1004), the model conversion processing section 301 then reads out the facility type (class name) of the relevant mRID from the facility type table 803. And, it is checked whether or not the relevant facility type is ConnectivityNode (S1010).

If the relevant facility type is ConnectivityNode (YES in S1010), the model conversion processing section 301 adds the relevant mRID to the terminal end list field of the record now attracting attention in the main facility table 801 (S1011). And the processing advances to step S1008.

If the relevant facility type is not ConnectivityNode (NO in S1010), the model conversion processing section 301 immediately advances to step S1008.

If there is not the i-th mRID in the instance of the main device now attracting attention in step S1003 (NO in S1003), the model conversion processing section 301 terminates the above series of processing (S1012).

Figure 11:
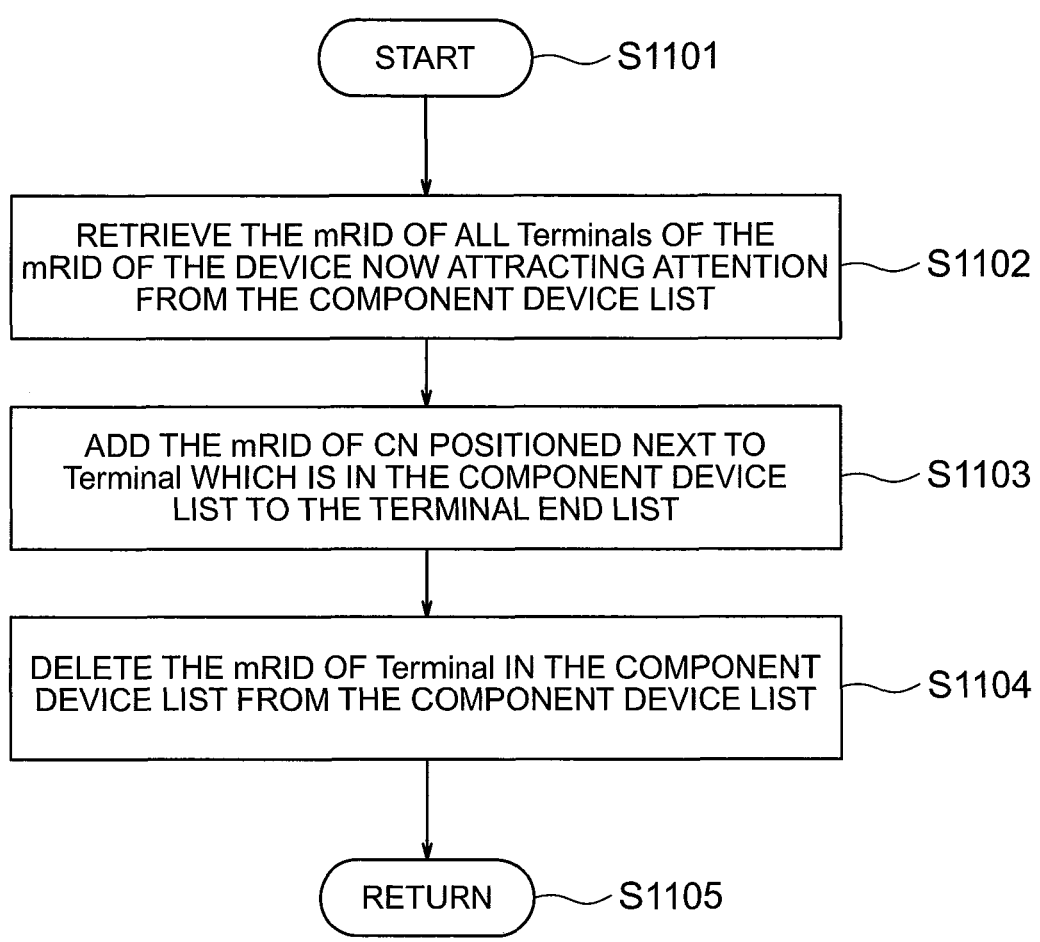
FIG. 11 is a flow chart showing a flow of terminal end processing that is executed by the model conversion processing section of the power system analysis server.

FIG. 11 is a flow chart showing a flow of terminal end processing executed by the model conversion processing section 301 of the power system analysis server 103. It shows the details of step S1009 of FIG. 10.

When processing is started (S1101), the model conversion processing section 301 inquires the CIM database server 102 about the mRID now attracting attention of the device (instance). And, the mRID of Terminal, which is stored in the field showing a connected relation between instances, of the relevant instance, is retrieved from the component device list of the record now attracting attention in the main facility table 801 (S1102).

The model conversion processing section 301 then inquires the CIM database server 102 about the mRID of Terminal registered in the component device list. And, the mRID of ConnectivityNode, which is stored in the field showing a connected relation of instances, of the relevant instance is added to the terminal end list of the record now attracting attention in the main facility table 801 (S1103).

And, the model conversion processing section 301 deletes the mRID of Terminal registered in the component device list and found in step S1102 from the component device list (S1104), and the above series of processing is terminated (S1105).

FIGS. 12A, 12B, 12C, 12D and 12E are diagrams schematically showing the operation of the model conversion processing section 301 in the component device list field and the terminal end list field in the main facility table 801.

First, FIGS. 12A, 12B, 12C and 12D are diagrams showing the operation of the terminal end processing of FIG. 11.

Figure 12A:
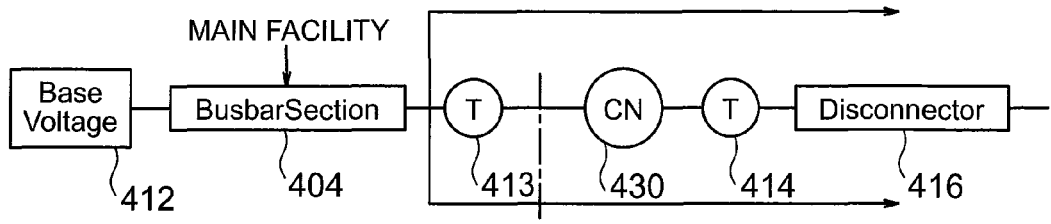
FIGS. 12A to 12E are diagrams schematically showing operations in a component device list field and a terminal end list field in a main facility table of the model conversion processing section.

In FIG. 12A, registration is made up to the Terminal instance 413 of the BusbarSection instance 404 in the component device list field of the record according to the PowerTransformer instance 401 in the main facility table 801.

Then, the recursive retrieval processing of FIG. 10 is executed in the Terminal instance 413, and decision processing is performed from step S1003 on the mRID of the BusbarSection instance 404 stored in the field showing a connected relation between instances of the Terminal instance 413. The mRID of the BusbarSection instance 404 becomes YES in step S1003, YES in step S1004, and NO in step S1005. And, terminal end processing is executed in step S1009.

Figure 12B:
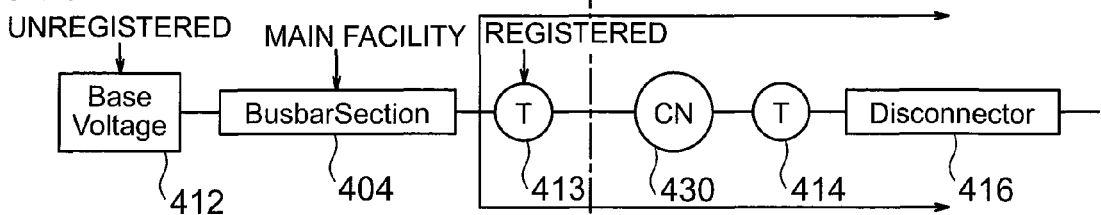

First, in FIG. 12B, the mRID of Terminal 413, which is stored in the field showing a connected relation between instances, of the BusbarSection instance 404 which is a main facility is retrieved from the component device list field of the record according to the PowerTransformer instance 401 in the main facility table 801. Then, the mRID of the Terminal instance 413 registered in the component device list field becomes apparent. The above is the operation in step S1102 of FIG. 11.

Figure 12C:
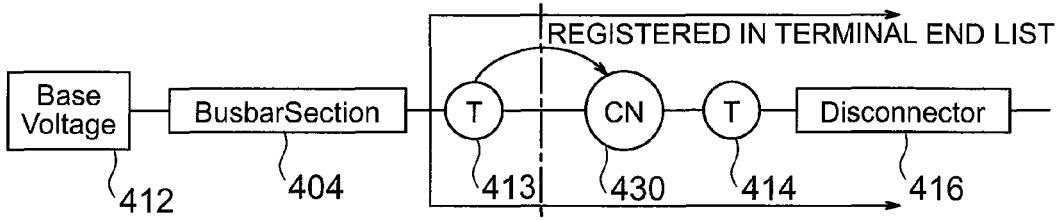

Then, in FIG. 12C, the mRID of the ConnectivityNode 430, which is stored in the field showing a connected relation between instances, of the Terminal instance 413 is added to the terminal end list field of the record according to the PowerTransformer instance 401 in the main facility table 801. The above is the operation in step S1103 of FIG. 11.

Figure 12D:
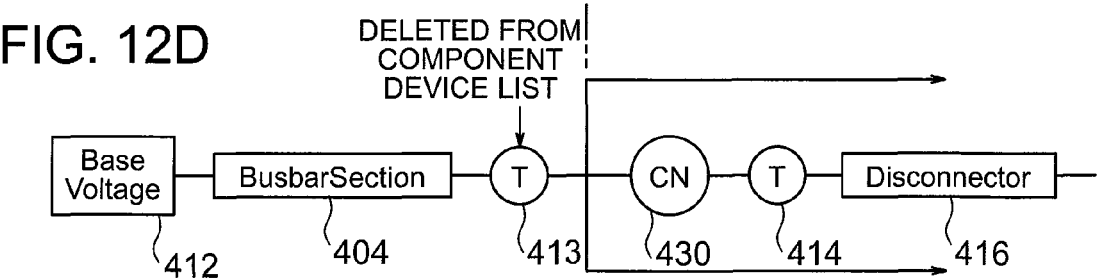

And, in FIG. 12D, the mRID of the Terminal instance 413, which is normally registered in the BusbarSection 404, is deleted from the component device list field of the record according to the PowerTransformer instance 401 in the main facility table 801. The above is the operation in step S1104 of FIG. 11.

Figure 12E:
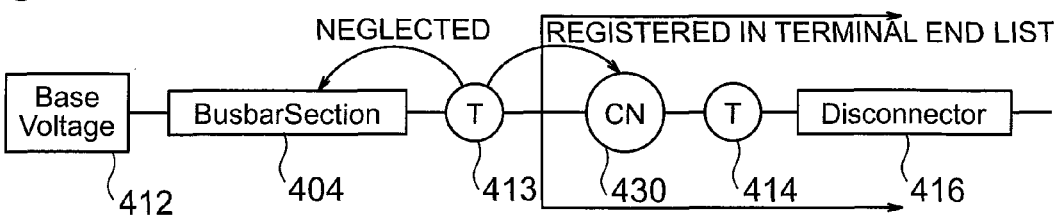

FIG. 12E is a diagram showing the operations in step S1010 and S1011 of FIG. 10.

In FIG. 12E, when the recursive retrieval processing is started from the BusbarSection instance 404, there are only the BusbarSection instance 404 and the ConnectivityNode instance 430 belonging to the PowerTransformer instance 401 each both ends of the Terminal instance 413. The above mRIDs are already registered in the main facility table 801. Since the facility type of the instance which is present at either end of the Terminal instance 413 is either a device having a certain entity or Connectivity Node, registration is made in the terminal end list field of the mRID of the ConnectivityNode instance 430 registered in the component device list field of another record in the main facility table 801, and the record according to the BusbarSection instance 404 in the main facility table 801. The above is the operations in steps S1010 and S1011 of FIG. 10.

Figure 13:
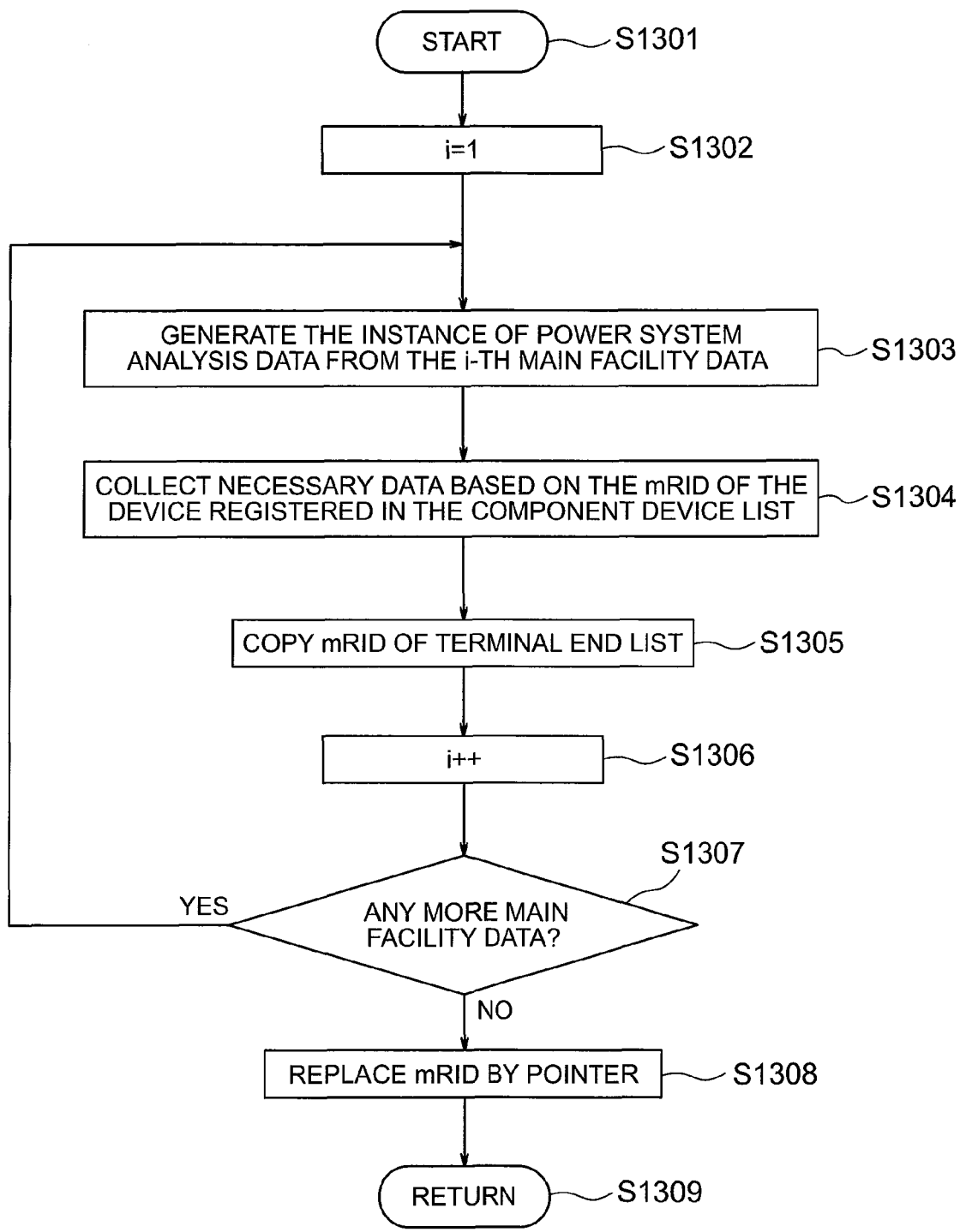
FIG. 13 is a flow chart showing a flow of power system analysis data generation processing that is executed by the model conversion processing section of the power system analysis server.

FIG. 13 is a flow chart showing a flow of power system analysis data generation processing executed by the model conversion processing section 301 of the power system analysis server 103. It shows the details of step S911 of FIG. 9.

When the processing is started (S1301), the model conversion processing section 301 first initializes the counter variable i to 1 (S1302).

The model conversion processing section 301 uses the mRID which is stored in the mRID field of the instance of the i-th record in the main facility table 801 and the facility type stored in the facility type field to generate the instance of power system analysis data (S1303).

The model conversion processing section 301 then uses the mRID, which is stored in the component device list field of the instance, of the i-th record in the main facility table 801 to inquire the CIM database server 102. And, it collects information necessary for the instance of the power system analysis data stored in the property information field of each device, and writes such information in a prescribed field of the instance of the power system analysis data (S1304).

The model conversion processing section 301 then copies the mRID, which is stored in the terminal end list field of the instance, of the i-th record in the main facility table 801 to the connection facility field of the instance of the power system analysis data (S1305). And, the counter variable i is incremented by one (S1306).

After the counter variable i is incremented, the model conversion processing section 301 checks whether or not there is the i-th record in the main facility table 801 (S1307).

If there still is a record (YES in S1307), the model conversion processing section 301 repeats the processing from step S1303.

If there is not a record (NO in S1307), the model conversion processing section 301 replaces the mRID, which was copied from the termination list to the connection facility field in step S1305, by a pointer of the record in order to speed up the retrieval (S1308), and the above series of processing is terminated (S1309).

FIG. 14 is a diagram showing an example of the field structure of the PowerTransformer class 1401 in the power system analysis data.

The PowerTransformer class 1401 in the power system analysis data has a facility number field, a name field, plural property information fields starting with a primary side positive-phase reactance field, and a connection facility field.

The property information field group stores various values which are recorded in the connection facility field of the device registered in the mRID field of the instance in the main facility table 801 and the device registered in the component device list field.

The facility number field stores the mRID of the mRID field of the instance in the main facility table 801 in step S1303 of FIG. 13.

Similarly, the connection facility field stores the mRID of the terminal end list field of the instance in the main facility table 801 in step S1305 of FIG. 13.

And, such mRIDs are replaced by the pointer indicating the instance of the PowerTransformer class 1401 in step S1308 of FIG. 13.

Here, various classes according to the CIM data model shown in FIG. 6 and FIG. 7 are compared with the PowerTransformer class 1401 according to the power system analysis data model shown in FIG. 14. In the PowerTransfomer class 1401, information necessary for power system analysis and dispersed to extend over the plural classes of the CIM data model is aggregated to one class. And, information unnecessary for the power system analysis containing a virtual instance has been erased. When only the information necessary for the power system analysis is aggregated, a computing procedure for following a connected relation of the instances is substantially decreased in the power system analysis, and speeding up of the power system analysis can be achieved. And, data of a data conversion source is the CIM database server 102 which is commonly used on the power system information system 101, so that inconsistency of the data with another system becomes difficult to occur.

According to this embodiment, the following application example can be performed.

The mRID read out from the CIM database server 102 is recorded in the property information field of the class of the power system analysis data shown in FIG. 14. Thus, it also becomes possible to change the CIM database server 102 based on the power system analysis data.

In this embodiment, the power system information system 101 is disclosed.

All instances used for the power system analysis are read out from the CIM database server 102 which is commonly used on the power system information system 101, and a connected relation between instances is configured while performing the recursive retrieval. And, conversion processing of the data model is performed to integrate information, which is necessary for power system analysis and dispersed to extend over the plural classes of the CIM data model, into one class. Information unnecessary for the power system analysis and including a virtual instance is erased by the data conversion processing. When the information necessary for the power system analysis is aggregated, the computing procedure for following the connected relation of the instances is substantially decreased in the power system analysis, and the power system analysis can be speeded up. And, data of the data conversion source is the CIM database server 102 which is commonly used on the power system information system 101, so that inconsistency of the data with another system becomes difficult to occur.

While certain embodiments of the present invention have been described above, the invention is not limited to the embodiments described above, and modifications and variations of the embodiments can be made without departing from the spirit and scope of the invention.

For example, the above-described embodiments have described the structures of the apparatus and system in detail and specifically in order to explain in an easily comprehensible manner, and they are not necessarily limited to those which are provided with all the structures described above. The structure of a certain embodiment can be partly replaced by the structure of another embodiment, and it is also possible to add the structure of another embodiment to the structure of the certain embodiment. And, part of the structure of each embodiment can also be undergone addition of another structure, deletion, or replacement.

The above-described each structure, function, processing section, etc. may be realized by hardware by designing part or all of them as for example an integrated circuit. The above-described each structure, function, etc. may be realized by software for interpreting and executing the programs to realize the functions by the processor. Information such as programs, tables, files, etc. for realizing the respective functions can be held in a volatile or non-volatile storage such as a memory, a hard disk, an SSD (Solid State Drive), etc., or a recording medium such as an IC card, an optical disk, etc.

It should be noted that control lines and information lines shown are considered to be required for description only and all of them are not necessarily shown in view of products. In practice, it may be considered that almost all structures are actually connected to one another.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A power system data model conversion method of a power system data model conversion system including a database which stores data related to devices of a power system including at least one of a transformer, generator, and a power line, and stores information of a connection relationship between the respective devices; and a server connected to the database that performs analysis of the power system, the method comprising:
   an instance readout step of reading out all instances from the database, which correspond to the devices, respectively;
   a connected relation analysis step of following a connection relationship of a main device, which is among the devices and is subject to power system analysis, with the other devices which are connected to the main device;
   a property information aggregation step of aggregating property information recorded in one or more of the instances into a single instance and also erasing the instance unnecessary for the power system analysis on the basis of the connection relationship in the connected relation analysis step to create a power system analysis data model; and
   a power system analysis step of performing analysis of the power system using the created power system analysis data model.

2. The power system data model conversion method according to claim 1, wherein the database is a Common Information Model (CIM) database that stores the data related to devices of a power system including at least one of a transformer, generator, and a power line, and stores the information of the connection relationship between the respective devices in an object format according to a CIM data model.

3. The power system data model conversion method according to claim 1, wherein the Common Information Model (CIM) database is provided with:
   a device class showing the devices;
   a Terminal class which is a virtual class showing a terminal end of a device instance belonging to the device class; and
   a ConnectivityNode class which is a virtual class showing a connected relation between Terminal instances belonging to the Terminal class, wherein
   the property information aggregation step erases the Terminal instance and a ConnectivityNode instance belonging to the ConnectivityNode class when the power system analysis data model is created.

4. A power system data model conversion system, comprising:
   a Common Information Model (CIM) database which stores data related to devices of a power system including at least one of a transformer, generator, and a power line, and stores information of a connection relationship between the respective devices in an object format according to a CIM data model;
   a server connected to the CIM database that performs analysis of the power system, the server including a processor and a memory, the memory storing instructions that when executed by the processor, causes the processor to execute:
   a model conversion processing section which: reads out all instances from the CIM database which correspond to the devices, respectively,
   follows a connection relationship of a main device, which is a device among the devices and is subject to power system analysis, with the other devices which are connected to the main device, and
   aggregates property information recorded in one or more of the instances into a single instance and erases an instance unnecessary for the power system analysis on the basis of the connection relationship to create a power system analysis data model, and
   an analysis of the power system using the created power system analysis data model.

5. A non-transitory medium of a server storing a power system data model conversion program that performs analysis of the power system, the server connected to a Common Information Model (CIM) database which stores data related to devices of a power system including at least one of a transformer, generator, and a power line, and stores information of a connection relationship between the respective devices in an object format according to a CIM data model, the program causing a computer of the server to execute:

- an instance readout step of reading out all instances from the Common Information Model (CIM) database which corresponds to the devices, respectively;
- a connected relation analysis step of following a connection relationship of a main device, which is a device among the devices and is subject to power system analysis, with the other devices which are connected to the main device; and
- a property information aggregation step of aggregating property information recorded in one or more of the instances into a single instance and erasing the instance unnecessary for the power system analysis on the basis of the connection relationship in the connected relation analysis step to create a power system analysis data model, and
- a power system analysis step of performing analysis of the power system using the created power system analysis data model.

* * * * *